(12) United States Patent
Gleckman

(10) Patent No.: US 6,266,105 B1
(45) Date of Patent: Jul. 24, 2001

(54) COLOR PROJECTION SYSTEM INCORPORATION ELECTRO-OPTIC LIGHT MODULATOR AND ROTATING LIGHT-REFLECTIVE ELEMENT

(75) Inventor: Philip Gleckman, Eindhoven (NL)

(73) Assignee: Philips Electornics North America Corporation, New York, NY (US)

( * ) Notice: Subject to any disclaimer, the term of this patent is extended or adjusted under 35 U.S.C. 154(b) by 0 days.

(21) Appl. No.: 09/127,003

(22) Filed: Jul. 31, 1998

(51) Int. Cl.[7] ....................................................... H04N 9/12
(52) U.S. Cl. ............................................. 348/743; 353/84
(58) Field of Search ................................... 348/743, 742, 348/744, 759; 353/84; H04N 9/12

(56) References Cited

U.S. PATENT DOCUMENTS

| | | | |
|---|---|---|---|
| 5,371,543 | * 12/1994 | Anderson | 348/743 |
| 5,532,763 | 7/1996 | Janssen et al. | |
| 5,548,347 | 8/1996 | Melnik et al. | 348/761 |
| 5,863,125 | * 1/1999 | Doany | 348/743 |

* cited by examiner

Primary Examiner—Michael Lee

(57) ABSTRACT

A color projection system, comprising a rotatable color drum with reflective segments on the surface of the drum, the segments composed of dichroic filters having different color reflection bands, and means for focussing images of the segments onto a reflective electro-optical light modulator panel, whereby in operation the segment images are scrolled across the surface of the light modulator, synchronously with the application of color components of a display signal corresponding to the colors of the scrolling segment images, to produce a full color display image.

20 Claims, 2 Drawing Sheets

COLOR PROJECTION SYSTEM INCORPORATION ELECTRO-OPTIC LIGHT MODULATOR AND ROTATING LIGHT-REFLECTIVE ELEMENT

BACKGROUND OF THE INVENTION

This invention relates to color projection systems, and more particularly relates to such projection systems incorporating a single electro-optical light modulator.

Color projection display systems are known in which a white light source is separated into red, blue and green sub-beams for separate modulation by corresponding color components of an incoming display signal, and then the modulated subbeams are recombined into a full color display for projection onto a viewing screen. Modulation of the subbeams is commonly carried out using three separate electro-optical light modulators such as liquid crystal display (LCD) panels, one for each of the three subbeams.

However, in one type of color projection system, described for example in U.S. Pat. No. 5,532,763, the three subbeams are all modulated by a single LCD panel. This is accomplished by shaping the subbeams into band-shaped cross-sections, and scrolling the bands sequentially across the LCD panel, while synchronously addressing those portions of the panel which are illuminated by the bands with the corresponding display signal information. Such projection systems are referred to herein as single panel scrolling raster (SPSR) projectors.

The simultaneous use of a substantial portion of the available red, blue and green light through a single light valve panel provides optical efficiencies comparable to that of three-panel systems employing the same types of light-valve panels. Using only a single panel eliminates the need to mechanically converge different color images, formed on different panels, and reduces system cost.

Various scrolling means for such SPSR systems are disclosed in U.S. Pat. No. 5,548,347. A system employing single-prism scrolling means is simple and compact, while multiple-prism (either separated or physically joined) scrolling means offer better scroll-speed uniformity (for the different color light bands) and scroll-speed linearity (for each light band) than the single-prism system. A system employing three physically separate prisms located in separate light paths, as shown in FIG. 16 of the patent, offers better optical efficiency than a system employing three physically joined prisms, but is less compact.

A disadvantage of all such SPSR systems is the requirement for a relatively large LCD (having at least an approximately 1.3 inch diagonal for current lamp technology), in order to accept the light from the three separate primary color beams. Such large LCDs are expensive, and require the use of comparatively large, expensive optical components.

OBJECTS AND SUMMARY OF THE INVENTION

It is an object of the invention to provide an improved SPSR color projection system.

It is another object of the invention to provide such an improved system having only one moving part to accomplish scrolling.

It is another object of the invention to provide such an improved system in which the illumination beam is not separated into separate color beams prior to scrolling.

It is yet another object of the invention to provide such an improved system in which the optical architecture is simple and compact.

In accordance with the invention, a SPSR color projection system includes a single rotationally-symmetric element with reflective surface portions having different color reflection bands, and a single electro-optical light modulator.

In operation, the element rotates about its axis while white light from a source is incident on the reflecting surface, and is separated into color components by the surface portions which reflect the desired color bands into a relay lens which images a prescribed portion of the surface of the element onto the light modulator panel. The color bands reflected from the element are scrolled across the panel by virtue of its rotation.

Driver electronics synchronously address the panel with the corresponding color components of the display information during scrolling.

The use of such a reflective element as the scrolling means in a SPSR system eliminates the need to separate the white light into sub-beams prior to scrolling, and thereby enables a smaller (less than 1.3 inch) light modulator panel, and correspondingly smaller optical components. Thus, a simple and compact optical architecture is possible, leading to a compact projector with a small component count.

In accordance with a preferred embodiment of the invention, the rotationally-symmetric element has a cylindrical surface, and the reflective portions comprise dichroic filters having a cylindrical curvature matching that of the element's surface. Such curvature enables retro-reflection to take place when the incident light beam is directed normal to the surface of the element, insuring minimal color shifts due to the angular sensitivity of the cut-off wavelengths of the dichroic filters, as well as insuring minimal aberrations in the imaging of the surface onto the panel.

Moreover, such a reflective element, eg., a drum, employed in the retro-reflective mode as described above, can be of small cross-section (eg., less than 40 mm diameter), which further reduces size and cost.

BRIEF DESCRIPTION OF THE DRAWINGS

The invention will now be described in terms of a limited number of preferred embodiments, with reference to the drawings, in which.

DESCRIPTION OF THE PREFERRED EMBODIMENTS

Figure 1:
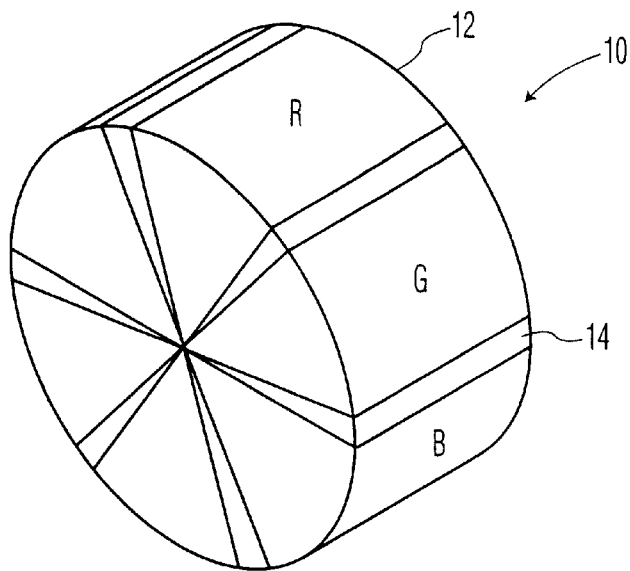
FIG. 1 is a perspective view of a reflective color drum in accordance with one embodiment of the scrolling means of the invention.

FIG. 1 shows in a perspective view an illustrative embodiment of a reflective color drum 10 of the invention, having six dichroic color segments which reflect red, green and blue light in the order R, G, B, R, G, B, on the cylindrical surface 12 of the drum. In practice, there could be as few as three, or more than six segments, the exact number dependent upon the desired speed of rotation of the drum and the desired addressing speed of the electro-optical light modulator. Dark bands 14 located between the segments prevent illumination of the RLCD during the time interval in which the pixels are returning to an "off" state.

The addition of one or more white segments interspersed with color segments can result in light output increases of the system of up to 50%. Typically, one white segment may be added to each RGB group of segments, resulting for example, in an eight-segment (R, G, B, W, R, G, B, W) variant of the drum of FIG. 1.

The segments may be fabricated, for example, by forming each dichroic filter on a separate thin, flexible substrate such as a plastic sheet (eg., 80 microns thick) or a glass sheet (e.g., 50 microns thick), and then dividing the sheets into segments of the appropriate size. The segments are then flexed to conform to the drum surface and attached, eg., with a bonding agent.

Preferably, the flexible sheet is plastic, chosen from low temperature plastics, such as polycarbonates and polyesters, or high temperature plastics, such as polyimides (eg., Kapton™). Suitable dichroic coating deposition methods include sputtering (in the case of low temperature plastic) and thermal evaporation (in the case of high temperature plastics).

The arrangement of the segments and the choice of adjacent layers should be such that the light of wavelengths outside the reflection band is substantially absorbed or scattered at angles which are outside the collection angle of the relay system.

Figure 2A:
FIG. 2A is a diagrammatic cross-section of a portion of one embodiment of a reflecting segment of the drum of FIG. 1.

FIG. 2A is a diagrammatic cross-section of a portion of one possible embodiment of the reflective segments of the drum of FIG. 1. Thin sheet 122 supports dichroic filter layer 123, and is bonded to the drum surface 120 by an adhesive layer 121. Layers 121 and 122 will normally be light transmitting. Thus, drum surface 120 should either be light-absorptive (eg., black matte) or light-scattering. Alternatively, or in addition, layer 121 and/or layer 122 can be made light-absorbing or light-scattering, eg, by the addition of pigment or scattering particles to the layers. Light which is not reflected by the filter layer 123 will thus be either absorbed or scattered by the underlying structure.

Figure 2B:
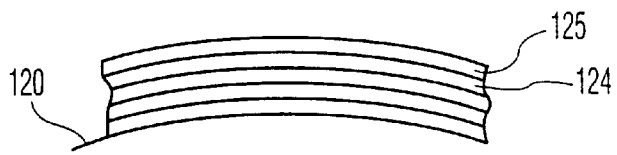
FIG. 2B is a diagrammatic cross-section of a portion of another embodiment of a reflecting segment of the drum of FIG. 1.

FIG. 2B is a cross-section similar to that of FIG. 2A, in which a quarter wave foil 124 and an anti-reflection layer 125 have been formed on top of the dichroic filter layer 123. This arrangement enables the use of simple uniaxial foils having a band width matched to that of the filter, so that the wide band quarter wave plate as shown in FIG. 3 may be omitted.

Figure 2C:
FIG. 2C is a diagrammatic cross-section of a portion of yet another embodiment of a reflecting segment of the drum of FIG. 1.

FIG. 2C shows an alternate embodiment of the reflective portions of the drum, in which a transmissive dichroic filter layer 128 replaces the reflective dichroic filter layer 123 in the FIG. 2A embodiment. Reflection is provided, for example, by an evaporated coating of aluminum 126, and quarter wave foil 127, inserted between the reflective layer 126 and the filter layer 128, changes the polarization of the incoming light from P to S, by virtue of the passage light through the layer twice, once as incident light and once as reflected light (the light which is reflected by the dichroic filter has unchanged polarization and is therefor rejected by the PBS which follows).

Figure 3:
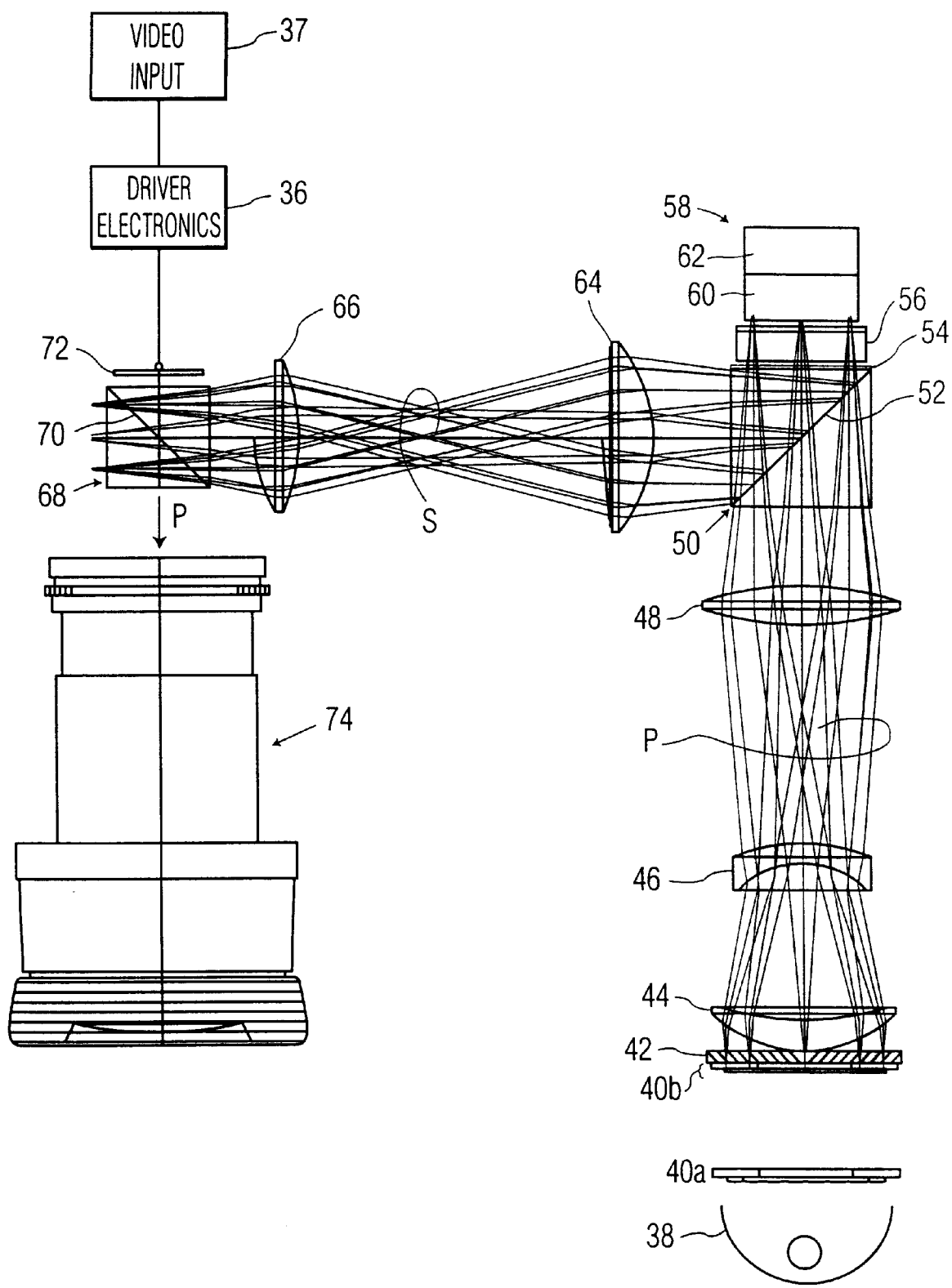
FIG. 3 is a schematic diagram of one embodiment of a color projection system of the invention, incorporating the color drum of FIG. 1, and including a telephoto set of lenses, three relay lenses and two polarization beam splitters (PBSs).

FIG. 3 is schematic diagram of one embodiment of a color projection system of the invention, incorporating a color drum 58 similar to that shown in FIG. 1, having reflecting dichroic filter segments on the surface thereof, two of which, 60 and 62 are visible in FIG. 3. Illumination from a source 38, preferably a high intensity source such as a high intensity discharge (HID) lamp, eg., a UHP lamp, is made uniform and rectangular by integrator plates 40a and 40b, and then converted to polarized light of the P type by a flat PCS (polarization conversion system) 42.

A telephoto set of lenses 44, 46 and 48 forms a telecentric P illumination beam at the PBS 50 and quarter wave foil 54, formed in this embodiment on a face of PBS 50. The telephoto set of lenses reduces the length of the light path between the PCS 42 and the PBS 50. Alternatively, a simpler lens system could be used, having at least one lens element.

This P beam passes through polarization beam splitter (PBS) 50 and wide band quarter wave foil 54, to cylindrical lens 56, which focusses the light onto the surface of the rotating drum 58 at angles of incidence such that retroreflection takes place (ie., light is directed along the normal to the surface of the drum). This eliminates color shifts which might otherwise occur due to the angle dependence of the the color reflection bands of the dichroic filters. The telecentricity of the incident beam insures the same angle of incidence across the drum surface.

After reflection by the drum 58, the P type polarized light is converted to S type by quarter wave foil 54, and thence reflected by the reflection surface 52 of PBS 50 into relay lenses 64 and 66, whose function is to image the filters onto RLCD 72.

The relay system of lenses 56, 64 and 66 should be of sufficient quality to image the filter segments precisely onto the RLCD with no or insignificant overlap of segments, thereby avoiding color mixing or at least keeping color mixing to tolerable levels. While lens 56 is a cylindrical lens, lenses 64 and 66 may be axially symmetric, such as molded aspheres, which have the advantage of reducing the length of the light path.

Reflection surface 70 of PBS 68 reflects the light from relay lenses 56, 64 and 66 onto the RLCD, which modifies the light in accordance with a display signal, for example, from video input 37, applied by driver electronics 36, to produce a display image. RLCE reflects the image to projection lens 74 via PBS 68, for projection to a viewer. RLCD 72 in the bright state converts the S light back to P light for projection by projection lens 74.

Telecentricity of the reflected beam is preserved by reflecting surface 52 of PBS 50, and by relay lenses 64, 66, and reflecting surface 70 of PBS 68, thus insuring that each pixel of the LCD sees the same angle of incidence across the PBS 68. Consequently, there are little or no color, brightness or contrast changes across the image generated by the RLCD 72.

The PBS's may be of the conventional (MacNeille) glass type, or may be the lighter weight polymer type, (see D. Wortman, "A Recent Advance in Reflective Polarizer Technology", 1997 International Display Research Conference, incorporated herein by reference) although where the highest quality image is desired, the glass type is preferred for PBS 68, since reflecting surface 70 can be made more optically flat than is the case for the polymer type.

The wide band quarter wave foil may be: 1) an achromatic stack of uniaxial foils; 2) a single non-uniaxial foil; or 3) a single layer of a polymer liquid crystal, of the type described in U.S. Pat. No. 5,506,704, issued to Broer et al.

The invention has been described in terms of a limited number of embodiments. Other embodiments, variations of embodiments and art-recognized equivalents will become apparent to those skilled in the art, and are intended to be encompassed within the scope of the invention, as set forth in the appended claims.

For example, instead of a drum, the rotationally-symmetric element may be a faceted element such as a six- or eight-sided polyhedron with a hexagonal or octagonal cross-section. The element could also have its reflecting surface portions or facets inclined with respect to the axis of rotation, as in the case of a conically-shaped element, in order to direct the reflected light away from the path of the incoming light.

Instead of forming the reflective segments on a substrate and attaching the substrate to the element, the segments could be formed directly on the surface of the element, eg., by depositing them through a mask.

Instead of beginning with P type polarization, converting to S type and then back to P type for projection, the polarization types could be reversed, ie., begin with S type, convert to P type and back to S type.

What I claim as my invention is:

1. A color projection system, comprising:
   a light source;
   a rotationally-symmetric element having an axis of rotation and reflective surface portions substantially perpendicular to the axis of rotation, the reflective surface portions comprising a plurality of mutually different color reflection bands capable of reflecting light from the light source as a respective plurality of mutually different color bands;
   the first optical circuit disposed to direct light from the source onto the reflective surface portions;
   a rotator disposed for rotating the rotationally-symmetric element about the axis of rotation;
   a display-image producing electro-optical light modulator panel; and
   a second optical circuit disposed to direct light reflected from the reflective surface portions onto the light modulator panel.
   the color projection system being operable to scroll the color bands reflected from the rotating element across the panel.

2. The color projection system of claim 1 in which the reflective surface portions are curved surface portions.

3. The color projection system of claim 2 in which the curvature of the reflective portions matches that of the element surface.

4. The color projection system of claim 1 in which the reflective surface portions are cylindrically curved surface portions.

5. The color projection system of claim 1 in which the reflective portions of the surface comprise diachronic filters.

6. The color projection system of claim 5 in which the diachronic filters are formed on a support, and the support is bonded to the surface of the element.

7. The color projection system of claim 5 in which the diachronic filters have color reflection bands.

8. The color projection system of claim 5 in which the diachronic filters have color transmission bands.

9. The color projection system of claim 1 in which the first optical circuit includes a cylindrical lens.

10. The color projection system of claim 1 comprising a light integrator to integrate light from the source into a telecentric beam.

11. The color projection system of claim 1 comprising a polarization element to convert light from the source into P type polarized light.

12. The color projection system of claim 1 comprising a polarization element to convert light from the source into S type polarized light.

13. The color projection system of claim 1 in which the first optical circuit includes a telephoto lens set.

14. A color projection system, comprising:
    a light source;
    a rotationally-symmetric element having an axis of rotation and curved reflective surface portions, the reflective surface portions comprising a plurality of mutually different color reflection bands capable of reflecting light from the light source as a respective plurality of mutually different color bands;
    the first optical circuit disposed to direct light from the source onto the reflective surface portions;
    a rotator disposed for rotating the rotationally-symmetric element about the axis of rotation;
    a display-image producing electro-optical light modulator panel; and
    a second optical circuit disposed to direct light reflected from the reflective surface portions onto the light modulator panel,
    the color projection system being operable to scroll the color bands reflected from the rotating element across the panel.

15. The color projection system of claim 14 in which the curvature of the reflective portions matches that of the element surface.

16. The color projection system of claim 14 in which the reflective surface portions are cylindrically curved surface portions.

17. The color projection system of claim 14 in which the reflective portions of the surface comprise diachronic filters.

18. The color projection system of claim 14 in which the first optical circuit includes a cylindrical lens.

19. The color projection system of claim 14 comprising a light integrator to integrate light from the source into a telecentric beam.

20. The color projection system of claim 14 comprising a polarization element to convert light from the source into polarized light.

* * * * *